United States Patent [19]

Price

[11] 4,071,124
[45] Jan. 31, 1978

[54] ELECTRICAL POWER SUPPLY METHOD AND SYSTEM FOR OPEN PIT MINING EQUIPMENT

[76] Inventor: Donald L. Price, B.B. 2, Century Drive, Bend, Oreg. 97701

[21] Appl. No.: 718,044

[22] Filed: Aug. 26, 1976

[51] Int. Cl.² ............................................. H02G 11/00
[52] U.S. Cl. ..................................... 191/12 R; 244/33
[58] Field of Search .............. 104/122; 191/12 R, 41; 212/71; 244/33; 248/61, 68 R, 74 B

[56] References Cited

U.S. PATENT DOCUMENTS

| 1,055,691 | 3/1913 | Aalborg | 191/41 |
| 3,412,819 | 11/1968 | Kruckman | 191/12 R X |
| 3,658,278 | 4/1972 | Batchelor | 244/33 |
| 3,704,350 | 11/1972 | Itoh | 191/12 R |
| 3,706,385 | 12/1972 | Stewart | 212/71 |
| 3,839,631 | 10/1974 | Goddard | 244/33 X |

FOREIGN PATENT DOCUMENTS

| 248,796 | 2/1926 | Italy | 191/12 R |
| 65,777 | 2/1943 | Norway | 248/61 |
| 266,005 | 8/1927 | United Kingdom | 191/12 R |

Primary Examiner—Stephen G. Kunin
Attorney, Agent, or Firm—Klarquist, Sparkman, Campbell, Leigh, Hall & Whinston

[57] ABSTRACT

A land vehicle such as an electric motor-operated power shovel working on the floor of an open pit mine is supplied with electrical power from a remote source by a flexible electric power cable. To prevent vehicles working within and moving along the floor and terraced sides of the mine pit from being obstructed by or traveling over and damaging the power cable, such cable is suspended between its ends from a lighter-than-air balloon tethered at an elevation above the shovel and terrain between the power source and the shovel. The balloon is tethered to a support cable anchored at one end near the power source and at the other end to the shovel. Connectors placed at intervals along the support cable interconnect the support cable and the power cable while enabling the power cable to slide in opposite directions along the support cable. The support cable is connected to the shovel in a manner enabling the shovel to rotate while working without twisting the cables.

9 Claims, 3 Drawing Figures

ELECTRICAL POWER SUPPLY METHOD AND SYSTEM FOR OPEN PIT MINING EQUIPMENT

BACKGROUND OF THE INVENTION

1. Field of the Invention

The present invention relates to the transmission of electrical power from a remote source to an electric motoroperated materials-handling land vehicle, and more especially to the supplying of electrical power to electrically operated mining equipment working within open pit mines to increase mine production.

2. Description of the Prior Art

Referring to FIG. 3, of the drawings, illustrative of the prior art, a cross section is shown through a typical terraced open pit mine 10 for mining copper ore, iron ore or coal or other minerals. Typically giant power shovels with huge capacity buckets, one of which is shown at 11, are used to scoop the ore into large trucks, one of which is shown at 12, which then transport the ore out of the mine on haul roads leading out of the mine pit along its sloping terraced sides to a crushing mill outside the mine. The shovels are powered by large d.c. electric motors which are supplied with electrical power through high voltage electrical power extension cables 13 from a central stationary power source 14 outside the mine pit. Since there are usually several power shovels working in the mine pit, the pit floor is strewn with several of the large power cables, which typically are 4 or 5 inches in diameter and weigh approximately 6 pounds per lineal foot. To prevent damaging such cables, it is important that they not be run over by the trucks, shovels and other heavy equipment working in the mine. Therefore pairs of portable towers 15 mounted on skids suspend the extension cables 13 over the various haul roads on the floor of the mine pit. However, whenever one of the shovels 11 must be moved to a new location within the mine, the portable towers 15 must first be shifted and the cables 13 lifted and moved manually by truck and equipment operators and other personnel working in the mine. At such times, which are frequent, ore production comes to a standstill until the shovel move is completed. It is estimated that a power shovel having a capacity of 120 loads per 8-hour shift actually produces only 70 to 80 loads per shift, 58 to 66 percent of theoretical capacity, because of the down time involved in moving cables, towers, and shovels.

Another problem with the present system of transmitting power to the mining shovel is that the power cable 13 is plugged into a receptacle in the stationary base 11a of the shovel 11 and must be conducted through a turntable 11b to the motor in the rotatable shovel housing 11c. This is done using a large copper ring (not shown) on a stationary portion of the turn-table and spring-loaded brushes on a rotatable portion. Because of operating conditions within the mine and the long hours of uninterrupted use of the power shovels, it is necessary to replace the spring-loaded brushes frequently, about every 30 days in normal use. This usually requires one full 8-hour shift to accomplish. Also, at least several times a year the copper ring itself must be replaced by jacking the housing up off the ring. This is a two- or three-day job.

Still another problem in the current use of power extension cables in open pit mining is the safety hazard that such cables present to mine personnel. Such cables if damaged or broken by mining equipment present a serious danger of electrocution to mine personnel because of the high voltages carried by such cables.

Thus the current practice of transmitting electrical power to the power shovels through a large, heavy electrical extension cable is extremely expensive in terms of lost production time and dangerous.

Thousands of dollars have been spent in engineering studies and in trying various experimental systems in attempts to solve the foregoing problems, all without success. Accordingly, there is a need for a solution to these problems in order to increase open pit mine production to a level much closer to its theoretical capacity using existing equipment.

SUMMARY OF THE INVENTION

In accordance with the invention, the problems attendant with the current practice of transmitting electrical power to electrically operated equipment in an open pit mine are solved by suspending the power extension cable above the mining equipment and haul roads from a lighter-than-air balloon. This enables the power shovels to be moved without first manually moving any power cables in the mine and eliminates the need for skid-mounted tower pairs suspending the power cables over haul roads, thereby also eliminating the need to move such towers each time a power shovel is moved. This also permits trucks, dozers and other mining equipment to move freely within the mine pit without fear of cutting or damaging a power cable.

Accordingly, primary objects of the present invention are to increase the production and safety of open pit mining by providing an improved method and means for transmitting electrical power to electric motor-operated materials-handling vehicles from a remote power source.

Specific objects are to elevate the power cable completely between the remote power source and the vehicle, to use a lighter-than-air balloon to thus elevate the power cable, and to provide a support cable to tether the balloon and carry the power cable in suspension between the remote power source and the vehicle.

Another important object is to provide an improved connection of the power extension cable to the electrically operated power shovel by connecting the cable directly to the rotatable housing of the shovel rather than to its stationary base structure, thereby eliminating the need for a copper ring and brushes to transmit electrical power through the shovel's turntable and the need for periodic replacement of these parts.

These and other objects, features and advantages of the present invention will become more apparent from the following detailed description, which proceeds with reference to FIGS. 1 and 2 of the accompanying drawings.

DETAILED DESCRIPTION OF A PREFERRED EMBODIMENT

Figure 3:
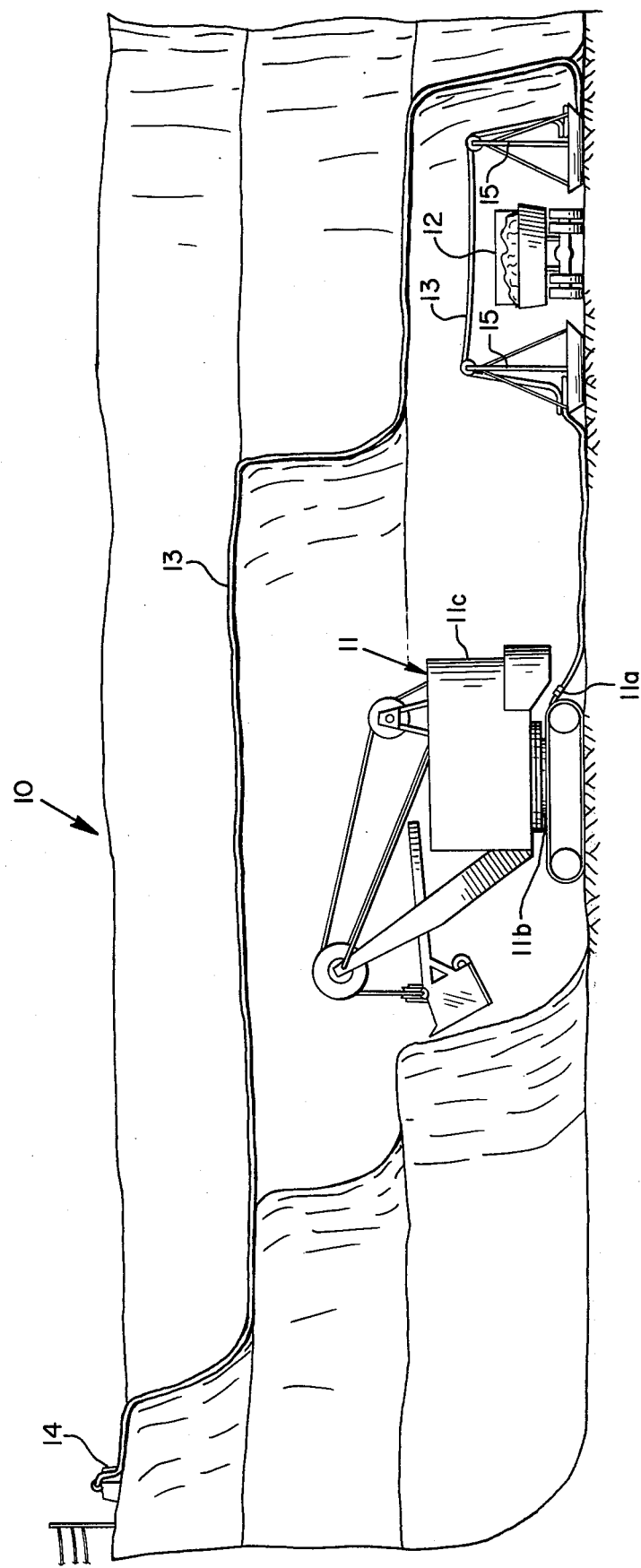
FIG. 3 is a cross-sectional view through another open pit mine illustrating the prior art method and apparatus for transmitting electrical power from a remote power source outside the mine to an electrically operated mining shovel within the mine pit, as previously described in detail in the preamble of the application.

The prior method and means for transmitting electrical power from a power source outside an open pit mine to an electric motor-operated power shovel working within the mine pit has been described in the preamble with reference to FIG. 3.

Figure 1:
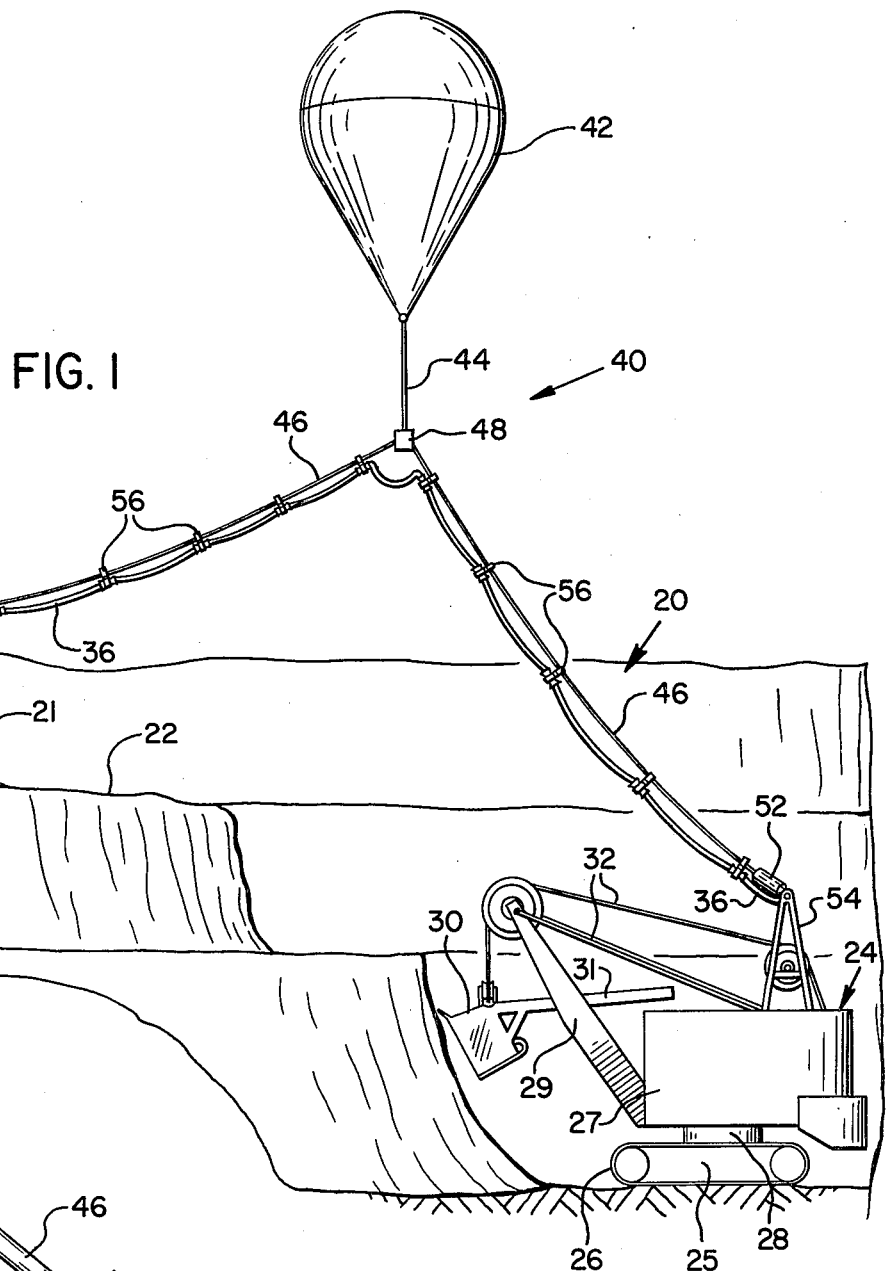
FIG. 1 is a cross section through a portion of an open pit mine illustrating the method and apparatus of the present invention.

Referring now to FIG. 1, the method and apparatus of the invention for transmitting electrical power from a remote power source to a mining shovel within an open pit mine will be described.

A mine pit 20 with sloping terraced sides 21 provides haul roads 22 along which trucks and other mining equipment can travel into and out of the mine pit. Several mining shovels typically work within the mine, one such shovel being shown at 24. The shovel is self-propelled, having a stationary base 25 mounted on powered tracks 26 and a housing 27 rotatable above a vertical axis on a turntable 28. A boom 29 extends forwardly from the housing and mounts a large capacity bucket 30 on a dipperstick 31. Boom and shovel operating cables 32 extend from the boom structure to powered cable drums (not shown) on the housing. A d.c. electric motor (not shown) within the housing 27 supplies the necessary power for operating the cables, rotating the housing and driving tracks 26.

Electrical power for operating the electric motor of shovel 24 is transmitted to the shovel from a remote electric power source or station 34 outside the mine pit via a flexible electrical power extension cable 36 connected at one end to the power source 34 and at the opposite end to the power shovel. Unless the power source 34 has its own generating capacity, high voltage transmission lines 38, originating at a primary power source or generating facility, transmit power to station 34.

Power cable 36 is suspended along substantially its entire length between its ends at an elevation above the intervening terrain sufficient to clear the haul roads, power shovels and other equipment working in the mine pit. A lighter-than-air balloon suspension means is provided for this purpose, such means being indicated generally at 40. The suspension means includes at least one lighter-than-air balloon 42 filled with a gas such as helium. A tether line 44 tethers the balloon to a flexible support cable 46 between the opposite ends of such cable at a tether connection 48. An anchor 50 anchors one end of the support cable outside the mine pit adjacent power source 34 and a corresponding end of the power extension cable 36. The opposite end of support cable 46 is connected to a shock absorber means 52 which in turn is swivelably connected to the top of a tower structure 54 on the roof of shovel housing 24. This swivel connection enables the housing of the power shovel to rotate on its turntable without twisting the support cable on the housing, thereby minimizing also any tendency to twist the power extension cable 36 which is also connected to a receptacle on the housing.

Figure 2:
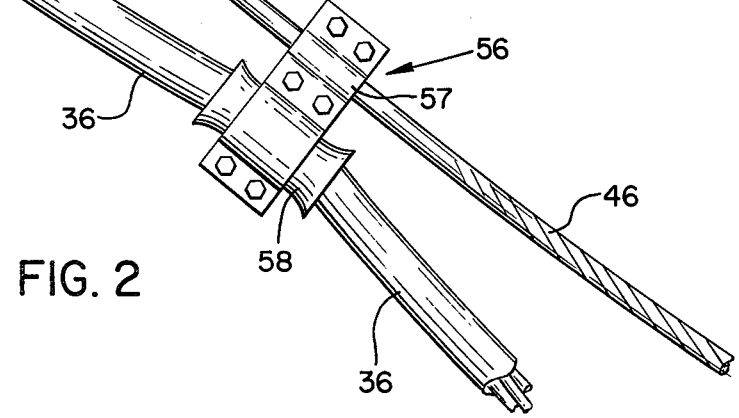
FIG. 2 is an enlarged fragmentary view of an interconnection of the support cable and the electrical power extension cable portion of the apparatus of FIG. 1.

Support cable 46 serves not only to tether balloon 42 but also as a suspension means for suspending power cable 36 between its ends. For this purpose support cable 46 is provided with cable-connecting means 56 at intervals along its length. One of such cable connectors is shown in detail in FIG. 2. Each such connector includes a clamping portion 57 fixedly attaching the connector to support cable 46 and a sleeve portion 58 through which power cable 36 slideably extends. Connector 56 is typical of all of the cable connectors along the length of the support cable. Thus power cable 36 is suspended from support cable 46 in a manner enabling the power cable 36 to slide relative to the support cable to prevent overstressing of the power cable upon rotation or linear movement of the power shovel and movement of the balloon.

Of course, for the power and support cables to be properly suspended as shown, such cables must be provided with sufficient slack between their opposite ends. The elevation of the balloon 42 at any time and thus the elevation of the power and suspension cables will depend upon the relative size and therefore lift of the balloon and the weight of and tension in such cables.

An important feature of the balloon is that it provides for self-adjustment of the slack in the power and support cables upon movement of the connected power shovel. For example, when the distance between the power shovel and power source is increased, the balloon will descend to a lower elevation to provide the necessary cable slack to accomplish this through increased cable tension. No manual adjustment or movement of the support or power cables is required. Conversely, upon a reduction of distance between the power shovel and the power source, the balloon will rise in response to the reduction in cable tension, taking up the increased cable slack.

Because the entire cable suspension system is self-adjusting, all down time for cable movement is eliminated when power shovels and other equipment are moved within the mine. Similarly, the suspended power extension cable presents no obstacle to trucks and other equipment moving within the mine or along haul roads leading out of the mine because the cable is suspended above all such roads. Therefore all need for skid-mounted towers for suspending the cable over access roads within the mine is eliminated, and there are no power cables on the floor of the mine pit whatsoever.

Also, because the power cable is connected directly to the housing of the power shovel, any need to transmit electrical power from the base of the shovel to the housing through its turntable is completely eliminated. This, then, also eliminates the need for the previously mentioned copper ring and spring-loaded brushes on the turntable to transmit power thereby eliminating any down time that would normally be needed periodically to replace these parts.

Although only one balloon is shown suspending the power suspension cable 36, it will be appreciated that more balloons could be used if necessary, depending on the lift capacity of each balloon and the weights of the support and power cables. Also, it will be appreciated that since several power shovels will normally be working within the mine pit, there will be a need for several power extension cables emanating from source 34, each of which can use either the same balloon system but with separate support lines, or entirely separate balloon suspension systems. Since the various power shovels within the mine pit will normally be positioned considerable distances apart, there should normally be no problem with entanglement of several suspended power cables. In any event, any potential entanglement problem using several balloon systems in one mine could be eliminated simply by providing different takeoff points along the rim of the mine for the several support and power cables.

It may also be necessary or desirable to provide lightning arresters on the cables; and if so, these can be provided within the skill of the art.

Having illustrated the principles of my invention by what is presently a preferred embodiment thereof, it should be apparent to those persons skilled in the art that the illustrated embodiment may be modified in arrangement, operation and detail without departing from such principles. I claim as my invention all such modifications as come within the true spirit and scope of the following claims.

I claim:

1. An electrical power supply system for supplying electrical power to electric motor-operated mining vehicles working on the floor of an open pit mine provided with haul roads on said floor and along terraced walls of said mine, said system comprising:

a source of electrical power sited on land above and adjacent to the mine pit, an electrical power-operated mining vehicle movable within the mine pit on the floor thereof, a flexible electrical power extension cable extending between and in electrical communication with said source and said vehicle for transmitting electrical power from said source to said vehicle, a flexible suspension support cable connected at one end to an anchor means outside said mine pit, and at an opposite end to said vehicle, cable connector means positioned at plural fixed spaced intervals along said support cable between its opposite ends and connecting said power cable to said support cable, and lighter-than-air balloon suspension means connected to said support cable so as to elevate said cables above the floor of said pit and above said haul roads while said power cable remains connected to said source and said vehicle so as to enable said vehicle and other vehicles to move within said pit and along said roads without being obstructed by or traveling over said cable, thereby obviating the need to move or avoid said cable.

2. A system according to claim 1 wherein said balloon means includes a tether line extending from said balloon to an intermediate portion of said support cable and tether connector means interconnecting said tether line and said support cable.

3. A system according to claim 1 including shock absorber means connecting said support cable to said vehicle.

4. A system according to claim 1 wherein said mining vehicle is an electric motor-operated shovel having a rotatable housing mounted on a turntable, a tower structure on the roof of said housing, said support cable being connected to the top of said tower structure in a manner enabling said housing to rotate without twisting said support cable.

5. A system according to claim 1 wherein said cable connector means includes a clamping portion fixedly attaching said connector means to said support cable and a sleeve portion slidably connecting said connector means to said power cable such that said power cable is freely suspended and sliable relative to said support cable.

6. A method of supplying electrical power to electric motor-operated mining equipment working on the floor of an open pit mine from a remote source of electrical power outside said mine pit, said method comprising the steps:

extending a slack flexible electrical power cable between said source and said vehicle and electrically interconnecting said source and said vehicle with said cable, and taking up said slack by suspending said power cable above the floor of said mine pit from a suspension support cable connected at plural fixed spaced intervals between its opposite ends to said power cable, and by connecting said support cable to a lighter-than-air balloon suspension means to elevate both said cables to an elevation above the floor and roads of the mine sufficient to enable vehicles moving within said pit to clear and travel beneath said cables along the terraced sides of said pit.

7. A system according to claim 1 wherein said mining vehicle includes a mobile base, a turntable carried by said base and a housing rotatable about a vertical axis on said turntable above said base, said flexible electric power extension cable extending in suspension to said vehicle housing and being connected to said vehicle housing above said turntable.

8. A system according to claim 7 wherein said housing includes a tower structure extending upwardly from the roof thereof, said electric power extension cable extending in suspension to and being connected to said tower structure.

9. A system according to claim 8 wherein both said electric power extension cable and said suspension support cable extend in suspension to said tower structure and are connected to an upper portion of said tower structure.

* * * * *